US012621764B2

(12) United States Patent
Cheng et al.

(10) Patent No.: US 12,621,764 B2
(45) Date of Patent: May 5, 2026

(54) MESH NETWORK MANAGEMENT SYSTEMS AND METHOD BASED ON WIRELESS SENSING

(71) Applicant: Wistron NeWeb Corporation, Hsinchu (TW)

(72) Inventors: Chui-Chu Cheng, Hsinchu (TW); Yi-An Chen, Hsinchu (TW); Horen Chen, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 364 days.

(21) Appl. No.: 18/183,211

(22) Filed: Mar. 14, 2023

(65) Prior Publication Data

US 2023/0345358 A1      Oct. 26, 2023

(30) Foreign Application Priority Data

Apr. 25, 2022    (TW) .................................. 111115671

(51) Int. Cl.
*H04W 52/02*          (2009.01)
*H04W 24/08*          (2009.01)
*H04W 84/18*          (2009.01)

(52) U.S. Cl.
CPC ....... *H04W 52/0203* (2013.01); *H04W 24/08* (2013.01); *H04W 84/18* (2013.01); *Y02D 30/70* (2020.08)

(58) Field of Classification Search
CPC . H04W 52/0203; H04W 24/08; H04W 84/18; Y02D 30/70
See application file for complete search history.

(56) References Cited

U.S. PATENT DOCUMENTS

| | | | |
|---|---|---|---|
| 10,039,107 | B2 | 7/2018 | Faerber et al. |
| 2011/0053493 | A1* | 3/2011 | Yanagihara ........... H04W 84/20 |
| | | | 455/7 |
| 2015/0334648 | A1* | 11/2015 | Ansari ................. H04W 48/12 |
| | | | 370/311 |
| 2019/0245916 | A1 | 8/2019 | Abalyaev |
| 2020/0020219 | A1 | 1/2020 | Ashar |

(Continued)

FOREIGN PATENT DOCUMENTS

CN            108873776  A      11/2018

*Primary Examiner* — Omar J Ghowrwal
(74) *Attorney, Agent, or Firm* — McClure, Qualey & Rodack, LLP

(57) ABSTRACT

A mesh network management system based on wireless sensing and a method thereof are provided. The mesh network management system includes a master wireless router and at least one slave wireless router signally connected to the mater wireless router. The master wireless router and the slave wireless router are in a normal mode. At least one wireless sensing detection zone is formed between the master wireless router and the slave wireless router. The master wireless router senses a radio frequency signal in the wireless sensing detection zone and confirms whether the wireless sensing detection zone meets an unmanned environment condition according to the radio frequency signal to generate an unmanned environment confirmation result. The master wireless router sets at least one of the master wireless router and the slave wireless router from the normal mode to an energy-saving mode according to the unmanned environment confirmation result.

20 Claims, 7 Drawing Sheets

(56)                    References Cited

U.S. PATENT DOCUMENTS

| | | | |
|---|---|---|---|
| 2021/0025944 A1* | 1/2021 | Park | G01R 31/392 |
| 2022/0124154 A1 | 4/2022 | Zou | |
| 2023/0164666 A1* | 5/2023 | Van Oost | H04W 40/246 |
| | | | 370/254 |

* cited by examiner

MESH NETWORK MANAGEMENT SYSTEMS AND METHOD BASED ON WIRELESS SENSING

RELATED APPLICATIONS

This application claims priority to Taiwan Application Serial Number No. 111115671, filed Apr. 25, 2022, which is herein incorporated by reference.

BACKGROUND

Technical Field

The present disclosure relates to a network management system and a method thereof. More particularly, the present disclosure relates to a mesh network management system based on wireless sensing and a method of managing a mesh network based on wireless sensing.

Description of Related Art

A wireless fidelity (WIFI®) is one of the main communication technologies that people usually use to surf the Internet. A mesh network is a method to transmit data and the controlling commands between network nodes through dynamic routing. The mesh network can include a plurality of access points (AP) that can be connected to each other through a wireless network, and so the mesh network is able to extend the coverage range of wireless network communication area in addition to allowing client devices to be connected to anywhere while maintaining the network connection quality when many people are online. However, with the client devices in wireless network becoming more popular, the number of mesh routers in mesh network also increases. When the user left the mesh network, the mesh routers are still in work mode and continue to consume power. On the other hand, when the mesh network is at home or work environment and there is no one around, there is a possibility of malicious connection or data snooping by other people.

In view of this, a mesh network management system and a method thereof that can detect in real time whether someone is present in the environment so as to control the work mode of mesh routers are indeed highly anticipated by the public and become the goal and the direction of relevant industry efforts.

SUMMARY

According to one aspect of the present disclosure, a mesh network management system based on wireless sensing includes a master wireless router and at least one slave wireless router. The master wireless router operates in a normal mode, and the at least one slave wireless router is signally connected to the master wireless router and operates in the normal mode. At least one wireless sensing detection zone is formed between the master wireless router and the at least one slave wireless router. The master wireless router senses a radio frequency signal in the at least one wireless sensing detection zone, and confirms whether the at least one wireless sensing detection zone meets an unmanned environment condition according to the radio frequency signal to generate an unmanned environment confirmation result. The master wireless router sets at least one of the master wireless router and the at least one slave wireless router from the normal mode to an energy-saving mode according to the unmanned environment confirmation result.

According to another aspect of the present disclosure, a method of managing a mesh network based on wireless sensing includes performing a signal sensing step, a zone confirming step, and a mode setting step. The mesh network includes a master wireless router and at least one slave wireless router, and the master wireless router and the at least one slave wireless router are in a normal mode. The signal sensing step includes configuring the master wireless router to sense a radio frequency signal in at least one wireless sensing detection zone formed between the master wireless router and the at least one slave wireless router. The zone confirming step includes configuring the master wireless router to confirm whether the at least one wireless sensing detection zone meets an unmanned environment condition according to the radio frequency signal to generate an unmanned environment confirmation result. The mode setting step includes configuring the master wireless router to set at least one of the master wireless router and the at least one slave wireless router from the normal mode to an energy-saving mode according to the unmanned environment confirmation result.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
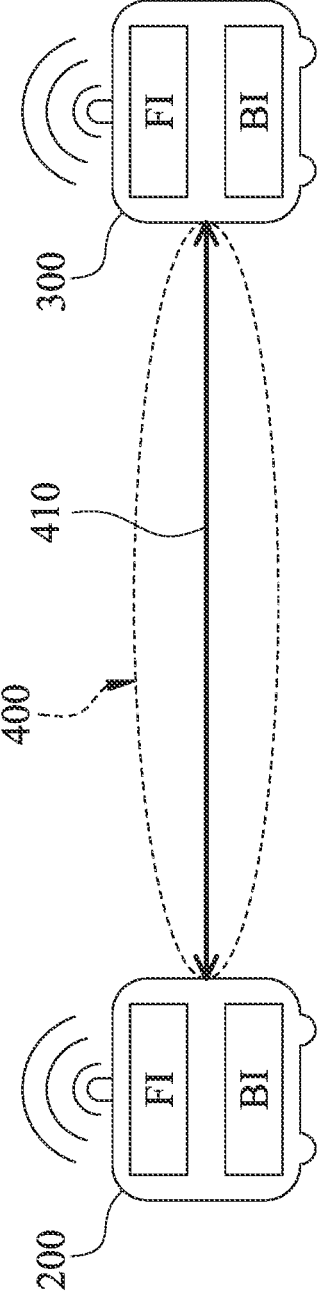
FIG. 1 is a schematic view of a mesh network management system based on wireless sensing according to a first embodiment of the present disclosure.

Referring to FIG. 1. FIG. 1 is a schematic view of a mesh network management system 100 based on wireless sensing according to a first embodiment of the present disclosure. The mesh network management system 100 based on wireless sensing includes a master wireless router 200 and at least one slave wireless router 300, and the at least one slave wireless router 300 is wirelessly and signally connected to the master wireless router 200. The master wireless router 200 and the slave wireless router 300 are both operating in a normal mode. In one embodiment, the number of the at least one slave wireless router 300 is plural, and the normal mode is an infrastructure mode of WIFI® communication technology, but the present disclosure is not limited thereto. The master wireless router 200 and the slave wireless router 300 have a wireless sensing detection zone 400 formed therebetween. The master wireless router 200 senses a radio frequency signal 410 in the wireless sensing detection zone 400, and according to the radio frequency signal 410, confirms whether the wireless sensing detection zone 400 meets an unmanned environment condition so as to generate an unmanned environment confirmation result. According to the unmanned environment confirmation result, the master wireless router 200 sets at least one of the master wireless router 200 and the slave wireless router 300 from the normal mode to an energy-saving mode. Therefore, the mesh network management system 100 based on wireless sensing uses the master wireless router 200 to sense or detect the radio frequency signal 410 in the wireless sensing detection zone 400 located between the master wireless router 200 and the slave wireless router 300 to adjust the mode of the master wireless router 200 or the slave wireless router 300 in an unmanned environment, and so not only is the power consumption saved, but the network security is also enhanced.

Specifically, the master wireless router 200 and the slave wireless router 300 form a plurality of wireless routers, and each of the wireless routers includes a fronthaul interface FI and a backhaul interface BI. In particular, the wireless router has three WIFI® frequency bands, which are respectively 2.4G, 5G and 6G, or 2.4G, 5GL and 5GH. One of these WIFI® frequency bands is used by the backhaul interface BI, and the wireless routers in the mesh network use the backhaul interface BI for network connection and signal communication between one another. Thus, the radio frequency signal 410 is transmitted between the backhaul interface BI of the master wireless router 200 and the backhaul interface BI of the slave wireless router 300. The other WIFI® frequency bands are used by the fronthaul interface FI to allow external user devices to connect to the wireless router for monitoring the wireless router and providing client devices to connect to the wireless router for surfing the Internet. When the master wireless router 200 and the slave wireless router 300 operate in the normal mode, the fronthaul interface FI and the backhaul interface BI of each wireless router are set to be turned on.

Further, when the radio frequency signal 410 is configured to be for wireless sensing purpose, the radio frequency signal 410 is generated by one of the master wireless router 200 and the slave wireless router 300. It should be noted that one of the master wireless router 200 and the slave wireless router 300 can serve as a wireless receiver, and the other one of the master wireless router 200 and the slave wireless router 300 can serve as a wireless transmitter. In other words, the wireless router can be a wireless receiver or a wireless transmitter, but the radio frequency signal 410 being sensed in the wireless sensing detection zone 400 is transmitted between a pair of wireless receiver and wireless transmitter. The master wireless router 200 captures or obtains channel state information (CSI) from the radio frequency signal 410 based on WIFI® wireless sensing technology, and performs motion detection, such as human walking or object moving, on the wireless sensing detection zone 400 according to the CSI. When the CSI of the radio frequency signal 410 meets an unmanned environment condition, such as having a small amplitude variation, the master wireless router 200 determines that there is no one in the wireless sensing detection zone 400 and generates an unmanned environment confirmation result. The master wireless router 200 then transmits a controlling command to the slave wireless router 300 according to the unmanned environment confirmation result to change the operation mode of the slave wireless router 300 from the normal mode to the energy-saving mode. The details of implementing the mesh network management system 100 based on wireless sensing in a mesh network environment will be described in following embodiments.

Figure 2:
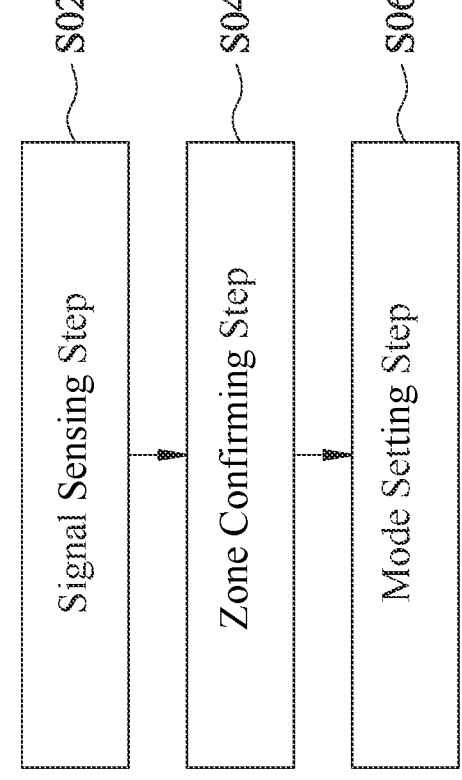
FIG. 2 shows a flow chart of a method of managing a mesh network based on wireless sensing according to a second embodiment of the present disclosure.
Figure 3:
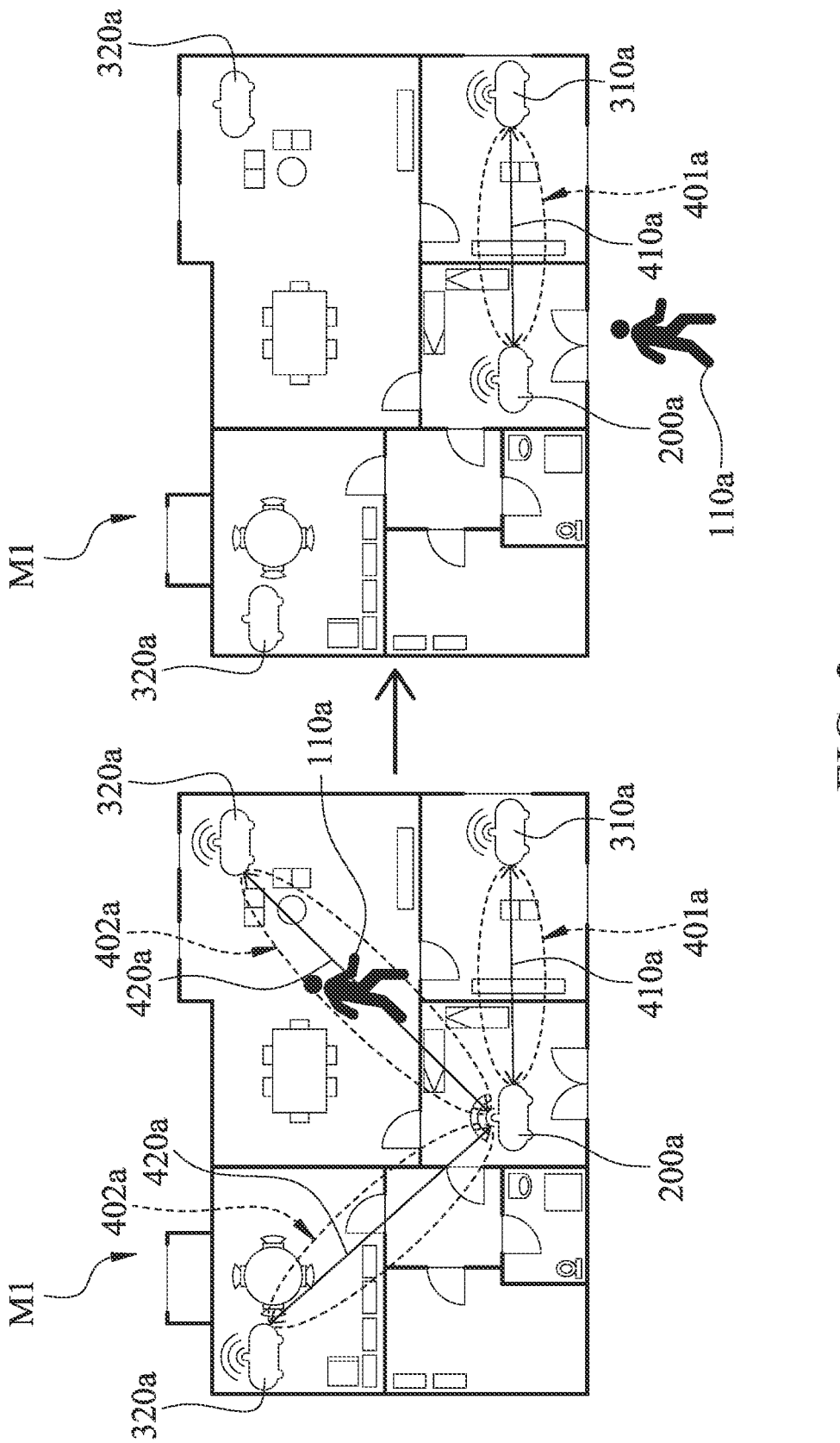
FIG. 3 is a schematic view illustrating a second slave wireless router changed from a normal mode to a sleep mode in a mode setting step of FIG. 2.

Referring to FIG. 2 and FIG. 3. FIG. 2 shows a flow chart of a method of managing a mesh network based on wireless sensing according to a second embodiment of the present disclosure. FIG. 3 is a schematic view illustrating a second slave wireless router 320a changed from the normal mode to a sleep mode in a mode setting step S06 of FIG. 2. The method of managing the mesh network based on wireless sensing (herein after, referred to as "mesh network managing method 500") is applied to the mesh network management system 100 based on wireless sensing and includes a signal sensing step S02, a zone confirming step S04, and a mode setting step S06. In this embodiment, the mesh network managing method 500 is used to manage a mesh network M1 in a home environment. In one embodiment, the mesh network M1 is connected in star, daisy chain, or tree topology, but the present disclosure is not limited thereby. The mesh network M1 includes a master wireless router 200a, and a plurality of slave wireless routers. The slave wireless routers can be divided into a first slave wireless router 310a and two second slave wireless routers 320a. The master wireless router 200a, the first slave wireless router 310a, and the two second slave wireless routers 320a are in a normal mode. In the home environment where the mesh network M1 is deployed, the master wireless router 200a and the first slave wireless router 310a are located at the entrance of the environment, for example, the entrance hall of the house, and a wireless sensing detection zone 401a is formed between the master wireless router 200a and the first slave wireless router 310a. The two second slave wireless routers 320a are distributed in the environment, such as in different rooms of the house, and two wireless sensing detection zones 402*a* are formed between the master wireless router 200*a* and each of the two second slave wireless routers 320*a*.

The signal sensing step S02 includes configuring the master wireless router 200*a* to sense a radio frequency signal 410*a* in the wireless sensing detection zone 401*a* and to sense two radio frequency signals 420*a* respectively in the two wireless sensing detection zones 402*a*.

The zone confirming step S04 includes configuring the master wireless router 200*a* to confirm whether the wireless sensing detection zone 401*a* meets the unmanned environment condition according to the radio frequency signal 410*a* so as to generate an unmanned environment confirmation result corresponding to the wireless sensing detection zone 401*a*, and configuring the master wireless router 200*a* to confirm whether each wireless sensing detection zone 402*a* meets the unmanned environment condition according to each radio frequency signal 420*a* so as to generate an unmanned environment confirmation result corresponding to each wireless sensing detection zone 402*a*. Moreover, the zone confirming step S04 further includes configuring the master wireless router 200*a* to confirm whether the wireless sensing detection zone 401*a* meets a manned environment condition according to the radio frequency signal 410*a* so as to generate a manned environment confirmation result corresponding to the wireless sensing detection zone 401*a*, and configuring the master wireless router 200*a* to confirm whether each wireless sensing detection zone 402*a* meets the manned environment condition according to each radio frequency signal 420*a* so as to generate a manned environment confirmation result corresponding to each wireless sensing detection zone 402*a*.

The mode setting step S06 includes configuring the master wireless router 200*a* to set the mode of at least one of the master wireless router 200*a*, the first slave wireless router 310*a*, and the two second slave wireless routers 320*a* from the normal mode to an energy-saving mode according to different unmanned environment confirmation results, and the energy-saving mode includes a fronthaul-off mode and a sleep mode. The mode setting step S06 further includes configuring the master wireless router 200*a* to set the mode of the master wireless router 200*a*, the first slave wireless router 310*a*, and the two second slave wireless routers 320*a* to stay in normal mode, in other words, to continue operating in normal mode. The fronthaul-off mode represents that the fronthaul interface of the wireless router is off or inactive, and the backhaul interface of the wireless router remains on or active. The sleep mode represents that both the fronthaul interface and the backhaul interface of the wireless router are in a sleep power-saving state.

In specific, if a moving object 110*a*, such as an user, has not left the mesh network M1 in the environment but instead is just walking between rooms as shown in the left-side diagram of FIG. 3, the CSI of the radio frequency signal 420*a* would meet the manned environment condition due to larger amplitude variation. The master wireless router 200*a* thus determines that there is someone in the wireless sensing detection zone 402*a*, generates a manned environment confirmation result, and sets the mode of the master wireless router 200*a*, the first slave wireless router 310*a*, and the two second slave wireless routers 320*a* to remain in the normal mode. In the same way, when the moving object 110 is located in one of the wireless sensing detection zones 401*a*, 402*a*, for example, when a user walks from one room to another room, the master wireless router 200*a* determines that there is someone in the mesh network M1 and sets the master wireless router 200*a*, the first slave wireless router 310*a*, and the two second slave wireless routers 320*a* to remain in the normal mode.

In the second embodiment, after the moving object 110*a* leaves the mesh network M1 in the environment as shown in the right-side diagram of FIG. 3, the master wireless router 200*a* sets the mode of each second slave wireless router 320*a* from the normal mode to the sleep mode according to the unmanned environment confirmation results corresponding to each of the wireless sensing detection zones 401*a*, 402*a*. When the second slave wireless router 320*a* is in the sleep mode, the fronthaul interface and the backhaul interface of the second slave wireless router 320*a* enter the sleep power-saving state, and so the master wireless router 200*a* no longer senses the environment zone between itself and each second slave wireless router 320*a* as shown in the right-side diagram of FIG. 3. As such, the mesh network managing method 500 of the present disclosure uses the master wireless router 200*a* to sense the radio frequency signals 410*a*, 420*a* to determine whether there are people in the wireless sensing detection zones 401*a*, 402*a* that are distributed in the environment. When there is no one, the master wireless router 200*a* sets the mode of the two second slave wireless routers 320*a* to the sleep mode, and in turn the power of the mesh network M1 is saved while maintaining the connectivity between the master wireless router 200*a* and the first slave wireless router 310*a* and the external user devices.

Figure 4:
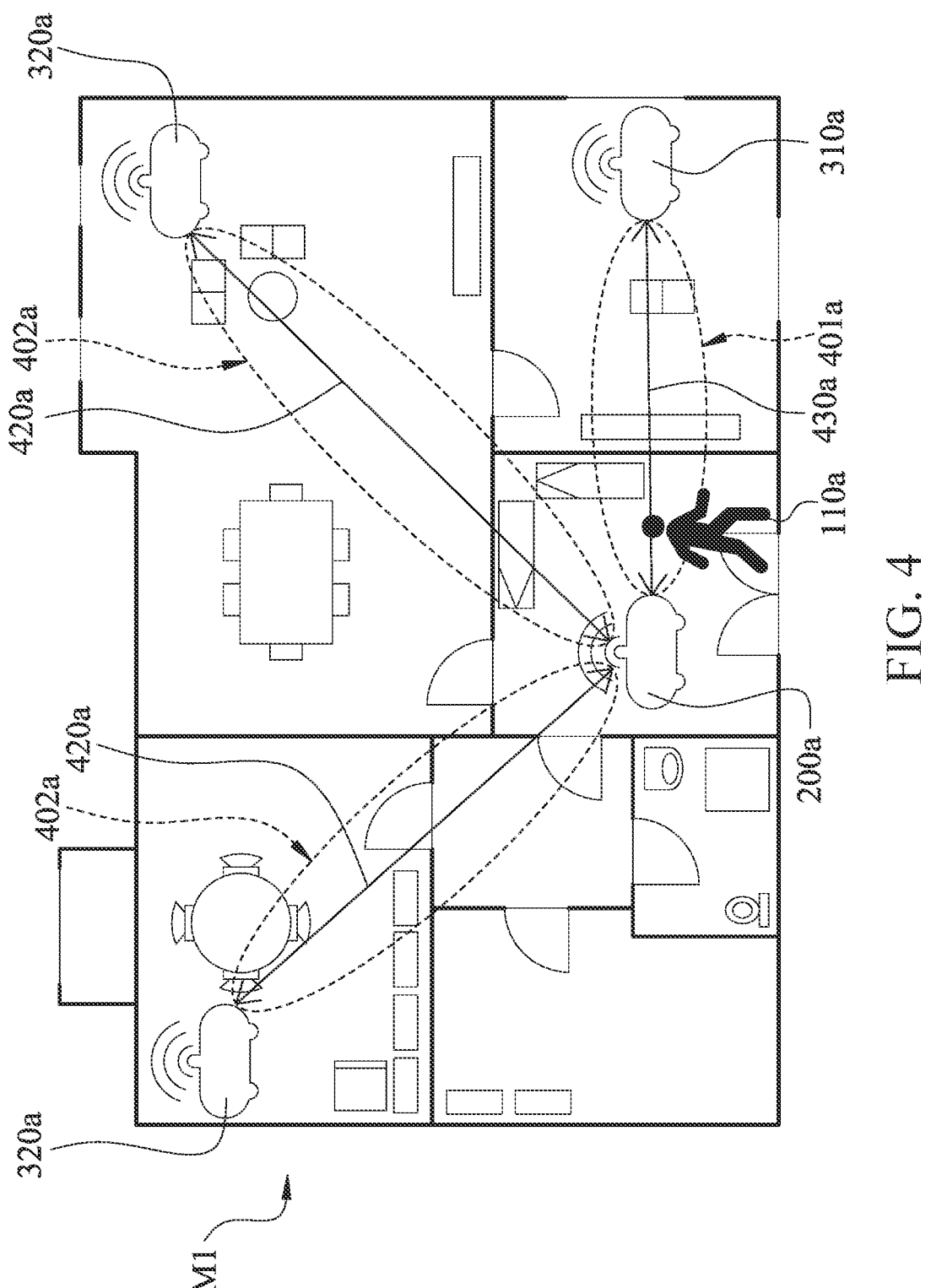
FIG. 4 is a schematic view illustrating the second slave wireless router of FIG. 3 changed from the sleep mode to the normal mode.

Referring to FIG. 4. FIG. 4 is a schematic view illustrating the second slave wireless router 320*a* of FIG. 3 changed from the sleep mode to the normal mode. After the moving object 110*a* comes from outside back to the mesh network M1 in the environment, because the moving object 110*a* would pass by the wireless sensing detection zone 401*a* located at the environment entrance area, another radio frequency signal 430*a* is disturbed or interfered and thus sensed by the master wireless router 200*a*. The master wireless router 200*a* confirms whether the wireless sensing detection zone 401*a* meets the manned environment condition according to the radio frequency signal 430*a* so as to generate the manned environment confirmation result. When the CSI of the radio frequency signal 430*a* meets the manned environment condition, the master wireless router 200*a* determines that there is someone in the wireless sensing detection zone 401*a* and generates the manned environment confirmation result. The master wireless router 200*a* sets the mode of the two second slave wireless routers 320*a* from the sleep mode to the normal mode according to the manned environment confirmation result to wake up the two second slave wireless routers 320*a*, so that the user device can connect to all of the wireless routers in the mesh network M1 in real time. In short, when the moving object 110*a* enters or leaves the wireless sensing detection zone 401*a* located at the environment entrance area, the master wireless router 200*a* is driven to adjust the mode of all of the wireless routers in the mesh network M1 to the normal mode.

Figure 5:
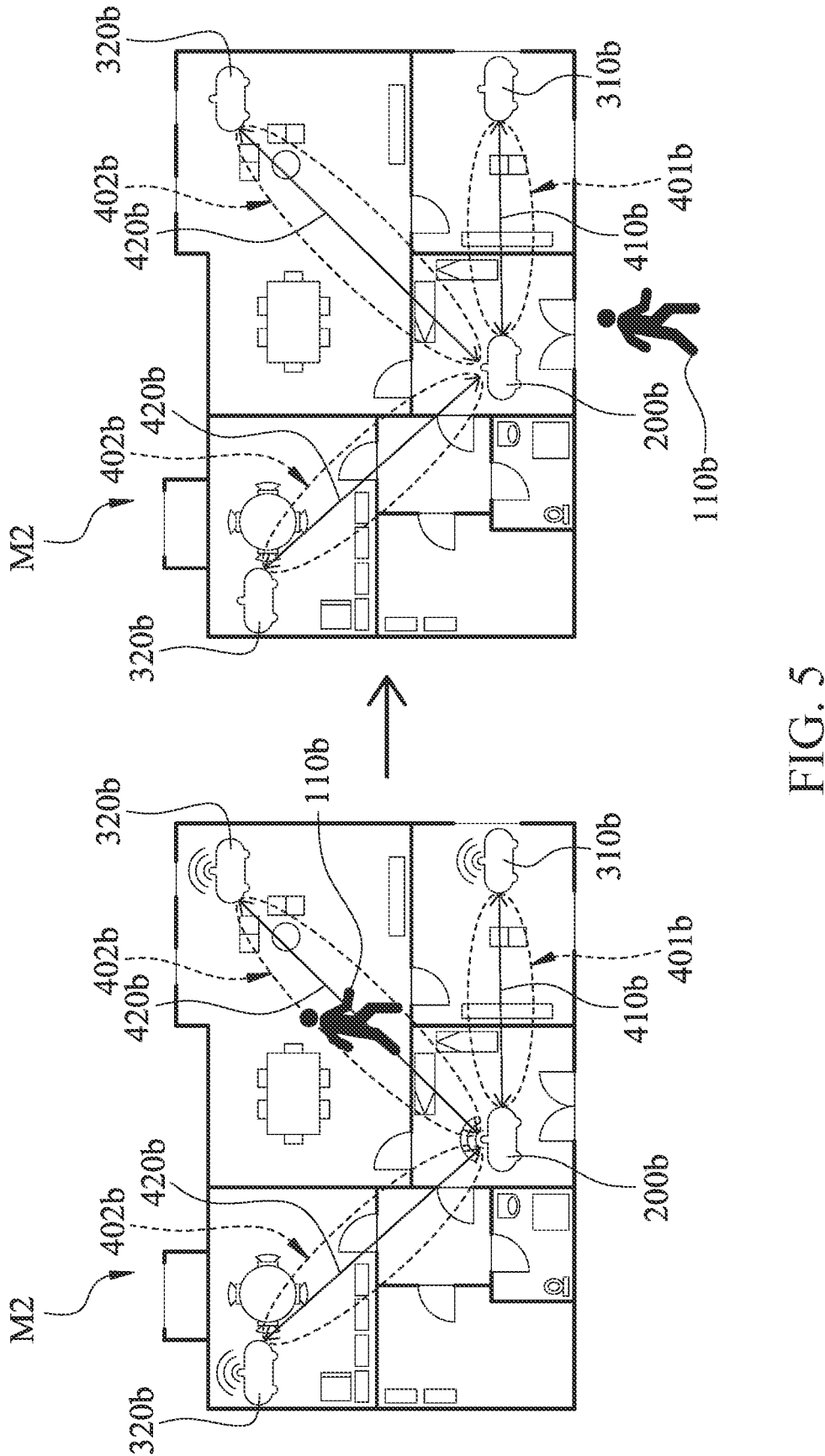
FIG. 5 is a schematic view illustrating a master wireless router, a first slave wireless router, and two second slave wireless routers changed from the normal mode to a fronthaul-off mode in a mode setting step of a method of managing a mesh network based on wireless sensing according to a third embodiment of the present disclosure.

Referring to FIG. 2 and FIG. 5. FIG. 5 is a schematic view illustrating a master wireless router 200*b*, a first slave wireless router 310*b*, and two second slave wireless routers 320*b* changed from a normal mode to a fronthaul-off mode in the mode setting step S06 of the mesh network managing method 500 according to a third embodiment of the present disclosure. The master wireless router 200*b*, the first slave wireless router 310*b*, and the two second slave wireless routers 320*b* in a mesh network M2 are all in the normal mode as shown in the left-side diagram of FIG. 5.

After a moving object 110*b* leaves the mesh network M2 in the environment, the mode setting step S06 of the third embodiment is performed to configure the master wireless router 200*b* to set the mode of the master wireless router 200*b*, the first slave wireless router 310*b*, and the two second slave wireless routers 320*b* from the normal mode to the fronthaul-off mode according to the unmanned environment confirmation result corresponding to the wireless sensing detection zone 401*b* and the two unmanned environment confirmation results corresponding to the two wireless sensing detection zones 402*b*. At this time, each wireless router turns off its fronthaul interface according to the fronthaul-off mode. When the fronthaul interface is turned off (changing to fronthaul-off mode), besides the user devices cannot identify the service set identifier (SSID) of each wireless router, other external communication devices also cannot identify the SSID of each wireless router. Since the backhaul interface of each wireless router still remains on, the backhaul interfaces of the first slave wireless router 310*b* and the two second slave wireless routers 320*b* are still connected to the backhaul interface of the master wireless router 200*b*, so that the master wireless router 200*b* can continue sensing the radio frequency signal 410*b* in the wireless sensing detection zone 401*b* and the two radio frequency signals 420*b* respectively in the two wireless sensing detection zones 402*b* as shown in the right-side diagram of FIG. 5. Hence, the mesh network managing method 500 of the present disclosure can reduce energy consumption when there is no one in the environment and also can enhance network security by turning off the fronthaul interfaces of all wireless routers. In addition, when there is no one in the environment, by continuing sensing the radio frequency signal 410*b* and the two radio frequency signals 420*b*, the master wireless router 200*b* is able to monitor whether the environment has been intruded by outsider, which can serve as an intrusion detection function.

Figure 6:
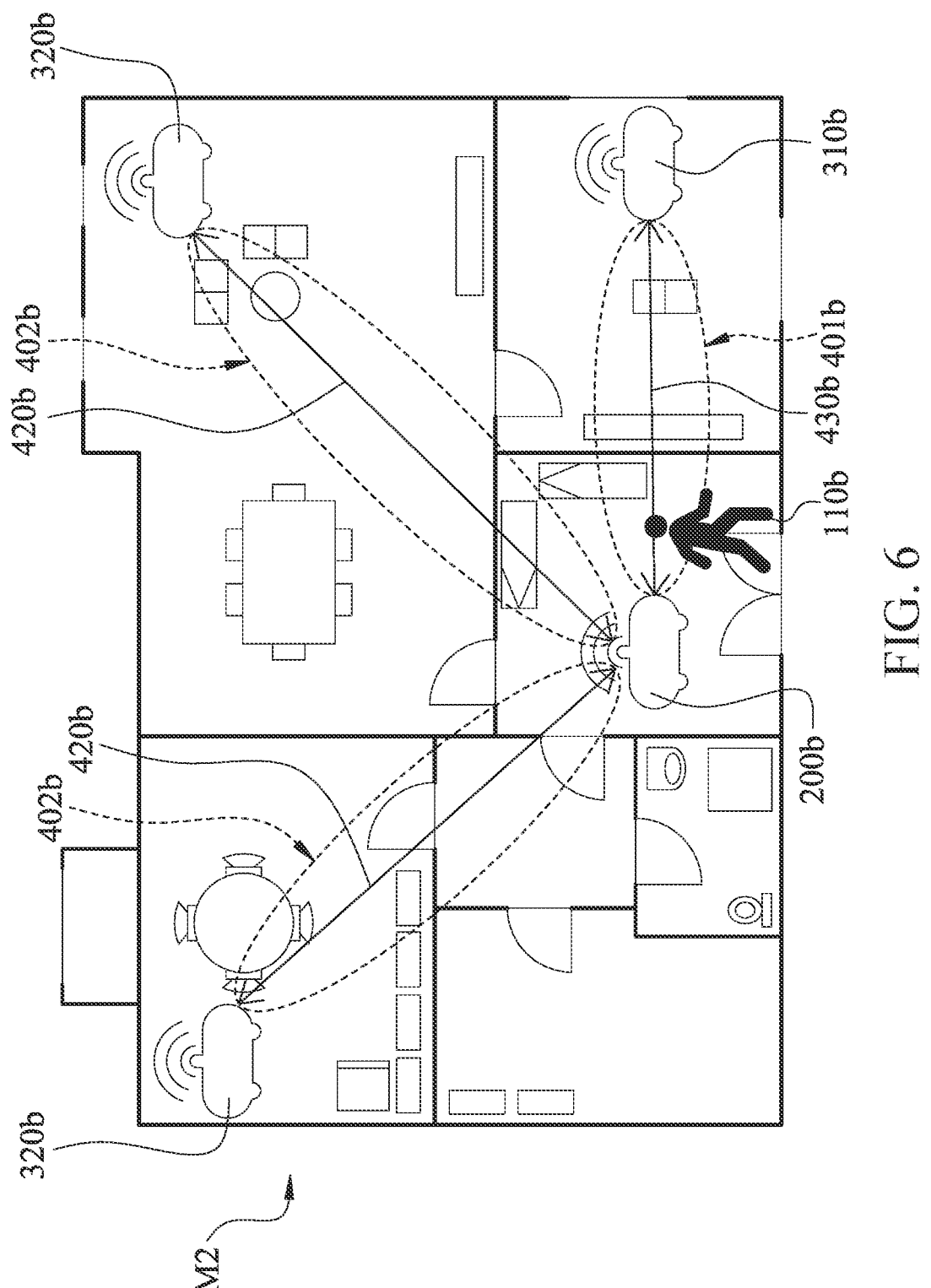
FIG. 6 is a schematic view illustrating the master wireless router, the first slave wireless router, and the two second slave wireless routers of FIG. 5 changed from the fronthaul-off mode to the normal mode.

Referring to FIG. 6. FIG. 6 is a schematic view illustrating the master wireless router 200*b*, the first slave wireless router 310*b*, and the two second slave wireless routers 320*b* of FIG. 5 changed from the fronthaul-off mode to the normal mode. After the moving object 110*b* returns from outside to the mesh network M2 in the environment, because the moving object 110*b* would pass by the wireless sensing detection zone 401*b* located at the entrance of the environment, another radio frequency signal 430*b* is thereby interfered and sensed by the master wireless router 200*b*. The master wireless router 200*b* confirms whether the wireless sensing detection zone 401*b* meets the manned environment condition according to the radio frequency signal 430*b* so as to generate the manned environment confirmation result. The master wireless router 200*b* sets the mode of the master wireless router 200*b*, the first slave wireless router 310*b*, and the two second slave wireless routers 320*b* from the fronthaul-off mode to the normal mode according to the manned environment confirmation result to turn on the fronthaul interface of each wireless router, and so the user device can immediately connect to all of the wireless routers in the mesh network M2.

Figure 7:
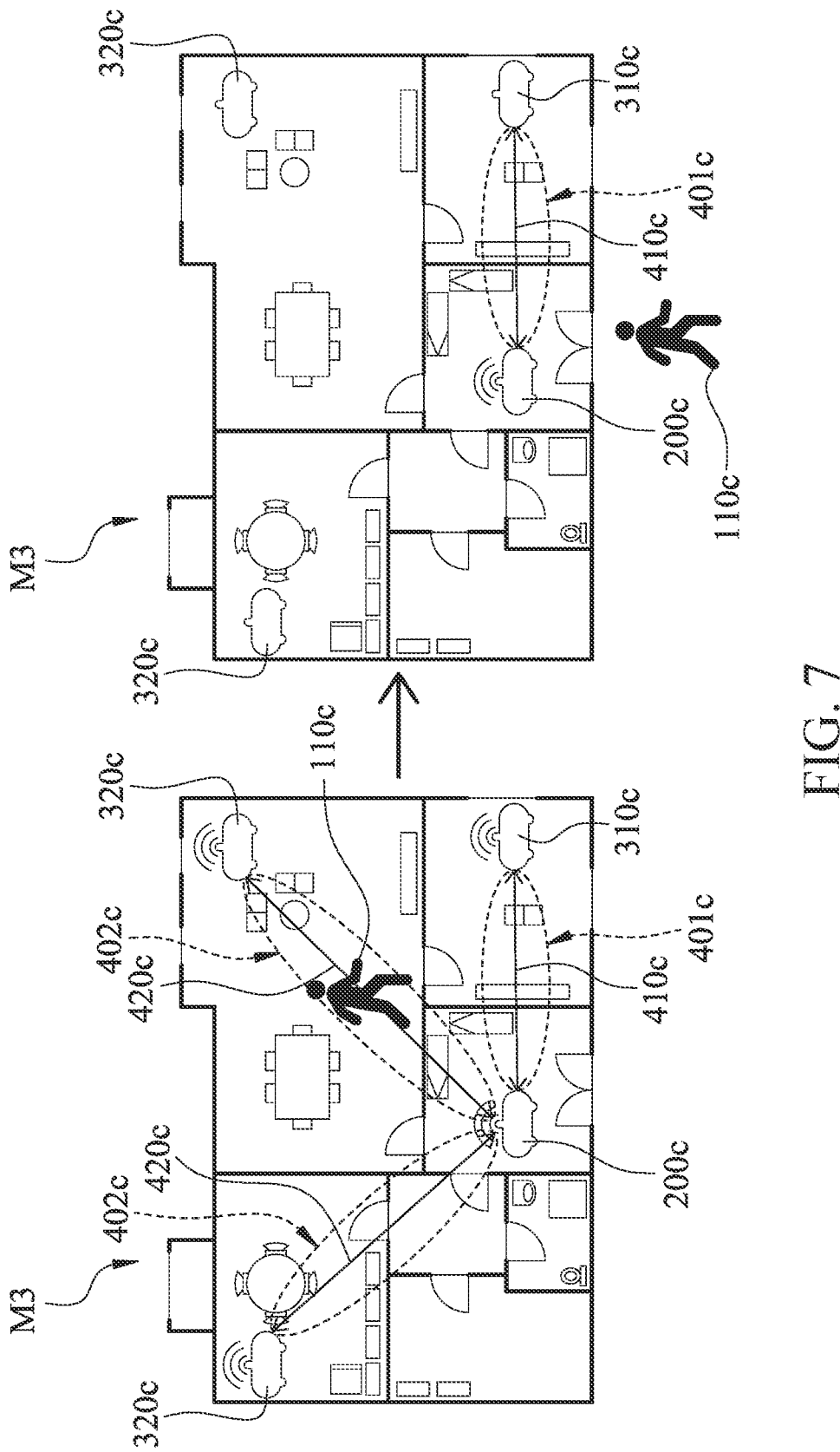
FIG. 7 is a schematic view illustrating a first slave wireless router changes from the normal mode to the fronthaul-off mode and second slave wireless routers change from the normal mode to the sleep mode in a mode setting step of a method of managing a mesh network based on wireless sensing according to a fourth embodiment of the present disclosure.

Referring to FIG. 2 and FIG. 7. FIG. 7 is a schematic view illustrating a first slave wireless router changes from the normal mode to the fronthaul-off mode and second slave wireless routers change from the normal mode to the sleep mode in a mode setting step of a method of managing a mesh network based on wireless sensing according to a fourth embodiment of the present disclosure. After a moving object 110*c* leaves a mesh network M3 in the environment as shown in the right-side diagram in FIG. 7, the mode setting step S06 of a fourth embodiment is performed to configure the master wireless router 200*c* to set the mode of the first slave wireless router 310*c* from the normal mode to the fronthaul-off mode according to the unmanned environment confirmation result corresponding to a wireless sensing detection zone 401*c*. It should be noted that when the first slave wireless router 310*c* is in the fronthaul-off mode, the fronthaul interface of the first slave wireless router 310*c* is turned off, and the first slave wireless router 310*c* is still connected to the master wireless router 200*c* through its backhaul interface. In other words, the backhaul interface of the first slave wireless router 310*c* and the backhaul interface of the master wireless router 200*c* are connected to each other, so that the master wireless router 200*c* continues to sense the radio frequency signal 410*c* in the wireless sensing detection zone 401*c*. On the other hand, the master wireless router 200*c* also sets the mode of the two second slave wireless routers 320*c* from the normal mode to the sleep mode according to the unmanned environment confirmation results corresponding to two wireless sensing detection zones 402*c*. As such, the mesh network managing method 500 of the fourth embodiment sets the first slave wireless router 310*c* located at the environment entrance area to the fronthaul-off mode and sets the two second slave wireless routers 320*c* located at other places to the sleep mode, and only retains connectivity of the master wireless router 200*c* with external user devices to maximize the saving on power-consumption of the mesh network M3. In other embodiments, after ensuring there is no one in the mesh network of the environment, the master wireless router sets the wireless routers to different energy-saving modes, including setting itself (the master wireless router) to the fronthaul-off mode of the energy-saving mode, and so the mode setting step of the present disclosure is not limited by the second, the third, and the fourth embodiments.

In summary, the present disclosure has the following advantages. First, the master wireless router executes the signal sensing step, the zone confirming step, and the mode setting step to adjust the mode of the master wireless router or the slave wireless router to the energy-saving mode when there is no one in the environment, which in turn reduces energy consumption and enhances network security. Second, by setting the slave wireless router located at the environment entrance area to the fronthaul-off mode and the slave wireless router located at other places to the sleep mode, the power consumption of the mesh network is saved to the greatest extent, and the master wireless router remains connectable to external user devices. Third, when there is no one in the environment, the master wireless router continues to sense each radio frequency signal in each wireless sensing detection zone to monitor whether the environment is intruded by outsider, and so can double as an intrusion detection function.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A mesh network management system based on wireless sensing, comprising:

a master wireless router, operating in a normal mode; and at least one slave wireless router, signally connected to the master wireless router and operating in the normal mode, wherein at least one wireless sensing detection zone is formed between the master wireless router and the at least one slave wireless router;

wherein the master wireless router senses a radio frequency signal in the at least one wireless sensing detection zone and confirms whether the at least one wireless sensing detection zone meets an unmanned environment condition according to the radio frequency signal to generate an unmanned environment confirmation result, and the master wireless router sets at least one of the master wireless router and the at least one slave wireless router from the normal mode to an energy-saving mode according to the unmanned environment confirmation result;

wherein the master wireless router and the at least one slave wireless router form a plurality of wireless routers, each of the plurality of wireless routers comprises a fronthaul interface and a backhaul interface, and when the master wireless router and the at least one slave wireless router are in the normal mode, the fronthaul interface and the backhaul interface of each of the plurality of wireless routers are set to be turned on;

wherein a number of the at least one slave wireless router is plural, the slave wireless routers are divided into a first slave wireless router and a plurality of second slave wireless routers, the backhaul interface of the first slave wireless router is signally connected to the backhaul interface of the master wireless router, and according to the unmanned environment confirmation result, the master wireless router sets the plurality of second slave wireless routers from the normal mode to a sleep mode of the energy-saving mode.

2. The mesh network management system based on wireless sensing of claim 1, wherein the radio frequency signal is generated by the master wireless router or one of the slave wireless routers, and the master wireless router captures a channel state information from the radio frequency signal.

3. The mesh network management system based on wireless sensing of claim 1, wherein, according to the unmanned environment confirmation result, the master wireless router sets at least one of the master wireless router and the first slave wireless router from the normal mode to a fronthaul-off mode of the energy-saving mode, and the at least one of the master wireless router and the first slave wireless router turns off its fronthaul interface according to the fronthaul-off mode.

4. The mesh network management system based on wireless sensing of claim 1, wherein the master wireless router confirms whether another wireless sensing detection zone formed between the master wireless router and the first slave wireless router meets a manned environment condition according to another radio frequency signal to generate a manned environment confirmation result, and according to the manned environment confirmation result, the master wireless router sets the plurality of second slave wireless routers from the sleep mode to the normal mode to wake up the plurality of second slave wireless routers.

5. The mesh network management system based on wireless sensing of claim 1, wherein the backhaul interface of each of the slave wireless routers is signally connected to the backhaul interface of the master wireless router, the master wireless router sets each of the plurality of wireless routers from the normal mode to a fronthaul-off mode of the energy-saving mode according to the unmanned environment confirmation result, and each of the plurality of wireless routers turns off its fronthaul interface according to the fronthaul-off mode.

6. The mesh network management system based on wireless sensing of claim 5, wherein the master wireless router confirms whether the at least one wireless sensing detection zone formed between the master wireless router and the slave wireless routers meets a manned environment condition according to another radio frequency signal to generate a manned environment confirmation result, and according to the manned environment confirmation result, the master wireless router sets each of the plurality of wireless routers from the fronthaul-off mode to the normal mode to turn on the fronthaul interface of each of the plurality of wireless routers.

7. The mesh network management system based on wireless sensing of claim 1, wherein the master wireless router confirms whether the at least one wireless sensing detection zone meets a manned environment condition according to the radio frequency signal to generate a manned environment confirmation result.

8. The mesh network management system based on wireless sensing of claim 7, wherein, according to the manned environment confirmation result, the master wireless router sets the at least one of the master wireless router and the slave wireless routers to continue operating in the normal mode.

9. A method of managing a mesh network based on wireless sensing, wherein the mesh network comprises a master wireless router and at least one slave wireless router, the master wireless router and the at least one slave wireless routers are in a normal mode, and the method comprising:

performing a signal sensing step comprising configuring the master wireless router to sense a radio frequency signal in at least one wireless sensing detection zone, wherein the at least one wireless sensing detection zone is formed between the master wireless router and the at least one slave wireless router;

performing a zone confirming step comprising configuring the master wireless router to confirm whether the at least one wireless sensing detection zone meets an unmanned environment condition according to the radio frequency signal to generate an unmanned environment confirmation result; and performing a mode setting step comprising configuring the master wireless router to set at least one of the master wireless router and the at least one slave wireless router from the normal mode to an energy-saving mode according to the unmanned environment confirmation result;

wherein the master wireless router and the at least one slave wireless router form a plurality of wireless routers, each of the plurality of wireless routers comprises a fronthaul interface and a backhaul interface, and when the master wireless router and the at least one slave wireless router are in the normal mode, the fronthaul interface and the backhaul interface of each of the plurality of wireless routers are set to be turned on;

wherein a number of the at least one slave wireless router is plural, the slave wireless routers are divided into a first slave wireless router and a plurality of second slave wireless routers, the backhaul interface of the first slave wireless router is signally connected to the backhaul interface of the master wireless router, and according to the unmanned environment confirmation result, the master wireless router sets the plurality of second slave wireless routers from the normal mode to a sleep mode of the energy-saving mode.

10. The method of managing the mesh network based on wireless sensing of claim 9, wherein the radio frequency signal is generated by the master wireless router or one of the slave wireless routers, and the master wireless router captures a channel state information from the radio frequency signal.

11. The method of managing the mesh network based on wireless sensing of claim 9, wherein the master wireless router sets at least one of the master wireless router and the first slave wireless router from the normal mode to a fronthaul-off mode of the energy-saving mode according to the unmanned environment confirmation result, and the at least one of the master wireless router and the first slave wireless router turns off its fronthaul interface according to the fronthaul-off mode.

12. The method of managing the mesh network based on wireless sensing of claim 9, wherein the master wireless router confirms whether another wireless sensing detection zone formed between the master wireless router and the first slave wireless router meets a manned environment condition according to another radio frequency signal to generate a manned environment confirmation result, and according to the manned environment confirmation result, the master wireless router sets the plurality of second slave wireless routers from the sleep mode to the normal mode to wake up the plurality of second slave wireless routers.

13. The method of managing the mesh network based on wireless sensing of claim 9, wherein the backhaul interface of each of the slave wireless routers is signally connected to the backhaul interface of the master wireless router, the master wireless router sets each of the plurality of wireless routers from the normal mode to a fronthaul-off mode of the energy-saving mode according to the unmanned environment confirmation result, and each of the plurality of wireless routers turns off its fronthaul interface according to the fronthaul-off mode.

14. The method of managing the mesh network based on wireless sensing of claim 13, wherein the master wireless router confirms whether the at least one wireless sensing detection zone formed between the master wireless router and the slave wireless routers meets a manned environment condition according to another radio frequency signal to generate a manned environment confirmation result, and according to the manned environment confirmation result, the master wireless router sets each of the plurality of wireless routers from the fronthaul-off mode to the normal mode to turn on the fronthaul interface of each of the plurality of wireless routers.

15. The method of managing the mesh network based on wireless sensing of claim 9, wherein the zone confirming step further comprises:

configuring the master wireless router to confirm whether the at least one wireless sensing detection zone meets a manned environment condition according to the radio frequency signal to generate a manned environment confirmation result.

16. The method of managing the mesh network based on wireless sensing of claim 15, wherein the mode setting step further comprises:

configuring the master wireless router to set the at least one of the master wireless router and the slave wireless routers to continue operating in the normal mode according to the manned environment confirmation result.

17. A mesh network management system based on wireless sensing, comprising:

a master wireless router, operating in a normal mode; and at least one slave wireless router, signally connected to the master wireless router and operating in the normal mode, wherein at least one wireless sensing detection zone is formed between the master wireless router and the at least one slave wireless router;

wherein the master wireless router senses a radio frequency signal in the at least one wireless sensing detection zone and confirms whether the at least one wireless sensing detection zone meets an unmanned environment condition according to the radio frequency signal to generate an unmanned environment confirmation result, and the master wireless router sets at least one of the master wireless router and the at least one slave wireless router from the normal mode to an energy-saving mode according to the unmanned environment confirmation result;

wherein the master wireless router and the at least one slave wireless router form a plurality of wireless routers, each of the plurality of wireless routers comprises a fronthaul interface and a backhaul interface, and when the master wireless router and the at least one slave wireless router are in the normal mode, the fronthaul interface and the backhaul interface of each of the plurality of wireless routers are set to be turned on;

wherein the backhaul interface of the at least one slave wireless router is signally connected to the backhaul interface of the master wireless router, the master wireless router sets each of the plurality of wireless routers from the normal mode to a fronthaul-off mode of the energy-saving mode according to the unmanned environment confirmation result, and each of the plurality of wireless routers turns off its fronthaul interface according to the fronthaul-off mode;

wherein the master wireless router confirms whether the at least one wireless sensing detection zone formed between the master wireless router and the at least one slave wireless router meets a manned environment condition according to another radio frequency signal to generate a manned environment confirmation result, and according to the manned environment confirmation result, the master wireless router sets each of the plurality of wireless routers from the fronthaul-off mode to the normal mode to turn on the fronthaul interface of each of the plurality of wireless routers.

18. The mesh network management system based on wireless sensing of claim 17, wherein the radio frequency signal is generated by one of the master wireless router and the at least one slave wireless router, and the master wireless router captures a channel state information from the radio frequency signal.

19. The mesh network management system based on wireless sensing of claim 17, wherein the master wireless router confirms whether the at least one wireless sensing detection zone meets the manned environment condition according to the radio frequency signal to generate another manned environment confirmation result.

20. The mesh network management system based on wireless sensing of claim 19, wherein, according to the another manned environment confirmation result, the master wireless router sets the at least one of the master wireless router and the at least one slave wireless router to continue operating in the normal mode.

* * * * *

14